United States Patent [19]

Murata

[11] 4,346,865
[45] Aug. 31, 1982

[54] FITTING STRUCTURE FOR A TANK

[75] Inventor: Masanori Murata, Yokohama, Japan

[73] Assignee: Nissan Motor Co., Ltd., Tokyo, Japan

[21] Appl. No.: 125,459

[22] Filed: Feb. 28, 1980

[30] Foreign Application Priority Data

Mar. 8, 1979 [JP] Japan .............................. 54-28625[U]

[51] Int. Cl.³ ............................................... A47K 1/08
[52] U.S. Cl. ................................ 248/311.2; 248/154; 248/313
[58] Field of Search ...................... 248/154, 311.2, 313; 224/42.45

[56] References Cited

U.S. PATENT DOCUMENTS

| | | |
|---|---|---|
| 1,218,056 | 3/1917 | Cole . |
| 1,487,372 | 3/1924 | Cobel . |
| 1,929,562 | 10/1933 | Pierce .................................. 248/20 |
| 2,335,955 | 12/1943 | Nordstrom ......................... 248/154 |
| 2,626,119 | 1/1953 | Crosby .............................. 248/311.2 |
| 2,681,164 | 6/1954 | Kalfen . |
| 2,891,753 | 6/1959 | Bittle . |
| 3,212,660 | 10/1965 | Adell.................................... 215/1 |
| 3,212,661 | 10/1965 | Adell ................................. 248/313 |
| 3,473,772 | 10/1969 | Nilson .............................. 248/311.2 |
| 3,917,202 | 11/1945 | Reinwall et al .................... 248/68 |
| 3,614,982 | 10/1971 | Krizman ............................. 248/313 |

FOREIGN PATENT DOCUMENTS

| | | |
|---|---|---|
| 7317224 | 10/1973 | Federal Rep. of Germany. |
| 2204954 | 5/1974 | France. |
| 1341645 | 12/1973 | United Kingdom . |
| 1391397 | 4/1975 | United Kingdom . |
| 1447396 | 8/1976 | United Kingdom . |
| 1504329 | 3/1978 | United Kingdom . |
| 1447396 | 8/1976 | United Kingdom. |

Primary Examiner—Henry Jaudon
Attorney, Agent, or Firm—Lane, Aitken, Kice & Kananen

[57] ABSTRACT

A structure for fitting a tank in an engine compartment of a vehicle body comprises a fitting member for partitioning the engine compartment, and a bracket fixed on the fitting member, the bracket having a first engaging portion for positioning the tank in its longitudinal direction, a second engaging portion for positioning the tank in its lateral direction, and a third engaging portion for positioning the tank in its vertical direction, the first, second and third engaging portions of the bracket being so designed as to engage with the opposite side walls of the tank thereby to hold detachably the lower portion of the tank relative to the vehicle body when the tank is set in position onto the bracket.

13 Claims, 9 Drawing Figures

FITTING STRUCTURE FOR A TANK

BACKGROUND OF THE INVENTION

The present invention relates to a structure for attaching a tank for an automotive vehicle, for example, such as a window washer tank, a reserve tank for engine-cooling water, a head lamp washer tank or the like which is arranged in an engine compartment thereof.

FIGS. 1 through 3 show a conventional structure for attaching a resin tank such as a window washer tank T. The engine compartment R has a plurality of vertical walls therein. One of such vertical walls is a vertical plate 6 such as a hood ledge. A channel-shaped bracket 7a is fixed to the vertical plate 6 by screw means. A V-shaped engaging groove 8 is formed in the bracket 7a. The stopper 9 fixed on the back side of the tank T is fitted into the engaging groove 8.

FIG. 4 shows another conventional structure for fitting a tank in the engine compartment wherein the bracket 7b is attached in a cantilever form onto a vertical wall (not shown).

FIG. 5 shows still a further conventional structure for arranging the tank for use in an automotive vehicle. The tank T has a plurality of projections 10 formed on the side wall thereof by which the tank is fixed directly on a vertical wall (not shown) by screw means without bracket means.

In all of the above-stated conventional structures, the vertical plate 6 such as a hood ledge is used as attaching or fixing means.

However, the number of parts to be arranged in the engine compartment R has recently increased because of countermeasures for exhaust gas, electric gas injectors (EGI) or the like. For example, many parts, such as a battery and relay box are fixed to the vertical plate 6 such as a hood ledge which partitions the engine compartment. In addition, other parts, such as a harness, wire and tube, are fixed on the vertical plate 6. As a result, it is difficult to secure a large space for the arrangement of the tanks T such as a window washer tank and head lamp washer tank within a restricted space of the engine compartment. If the capacity of a tank is more than 1 liter, it becomes extremely difficult to arrange properly the tank within the engine compartment.

SUMMARY OF THE INVENTION

Therefore, it is an object of the present invention to provide a structure for attaching a tank within an engine compartment of an automotive vehicle wherein a tank of a desired capacity can be effectively fitted within a restricted space of the engine compartment.

Because all parts are fixed to only a vertical plate such as a hood ledge which partitions the engine compartment in the conventional structures, it becomes difficult to secure a reasonable space for the arrangement of plural tanks in the engine compartment. The tanks can be arranged in other ways. For example, the tanks can be formed of a vertical-type or horizontal-type so as to increase the capacity thereof in such a way that each tank does not interfere with such parts as harness, wire, tube and others which are fixed on the vertical plate that the tank is placed between the other parts.

Consequently, according to the present invention, a structure for attaching a tank in an engine compartment comprises a fitting member such as a hood ledge and a bracket for holding detachably the lower portion of a tank made of, for example, a synthetic resin, relative to a vehicle body when the tank is set in position onto the bracket. The bracket is to be fixed on the fixing member by screw means, for example. Also, the bracket includes first, second and third engaging portions for positioning the tank in its three directions. It is preferable to hold the tank resiliently.

DETAILED DESCRIPTION OF THE PREFERRED EMBODIMENTS

Figure 1:
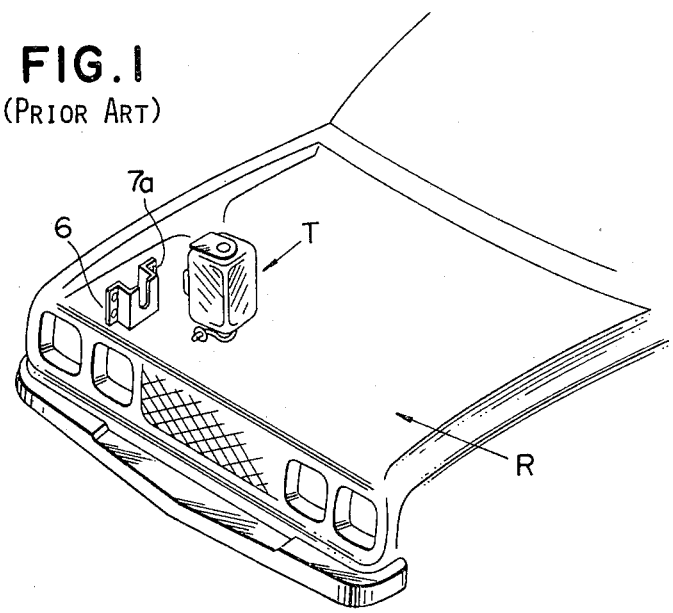
FIG. 1 is a schematic perspective view showing a conventional structure for fitting a window washer tank in an engine compartment of an automotive vehicle.
Figure 2:
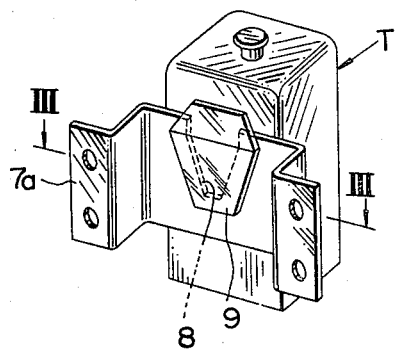
FIG. 2 is an enlarged perspective view of the fitting bracket and tank as shown in FIG. 1.
Figure 3:
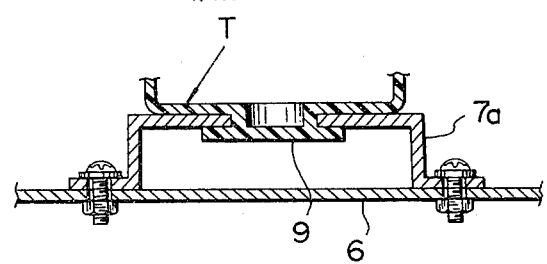
FIG. 3 is a sectional view of the conventional fitting structure taken along the line III—III in FIG. 2, showing a condition in which the tank is attached on a hood ledge.
Figure 4:
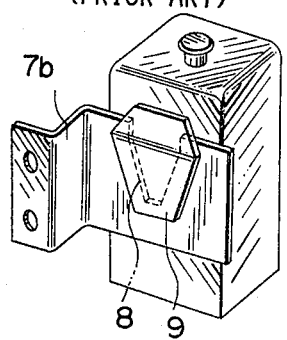
FIG. 4 is a perspective view showing a further conventional structure for fitting a resin tank in which it is combined with a fitting bracket.
Figure 5:
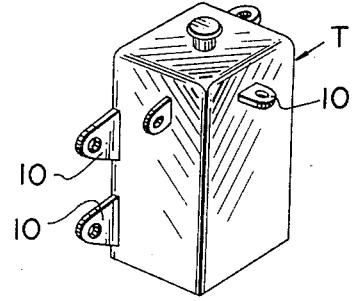
FIG. 5 is a perspective view showing still a further conventional fitting structure for a resin tank.
Figure 6:
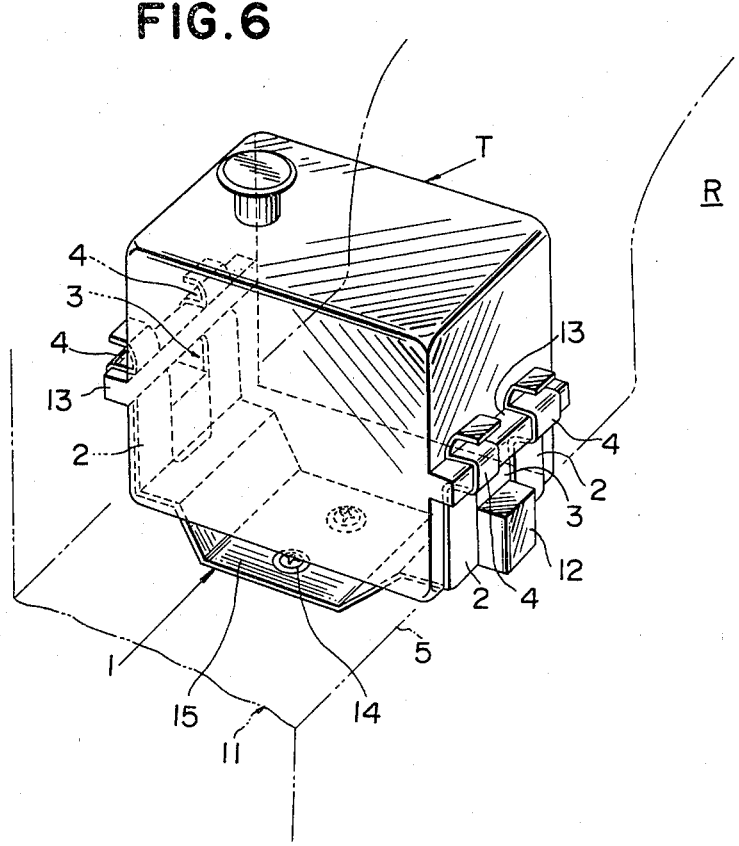
FIG. 6 is a schematic perspective view showing a structure for arranging a window washer tank in an engine compartment according to a first embodiment of the present invention.
Figure 7:
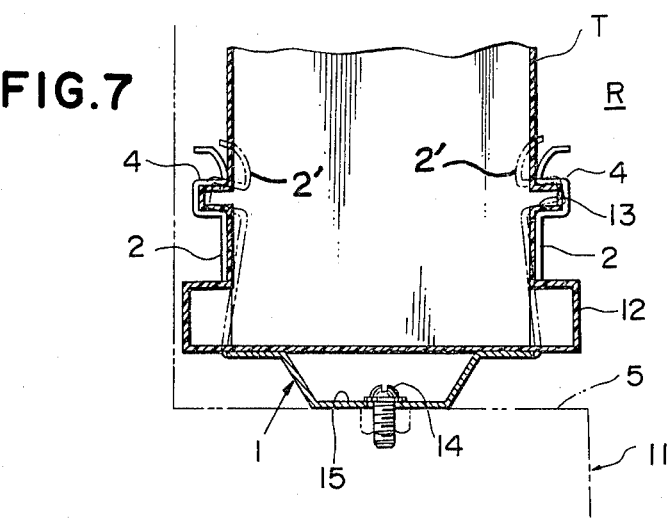
FIG. 7 is a schematic sectional view of the fitting structure as shown in FIG. 6.

Referring now to FIGS. 6 and 7, there is shown a first embodiment of the present invention. A hood ledge 11 defines a portion of an engine compartment R of an automotive vehicle. A fitting bracket 1 is attached by screw means 14 to an attaching portion 5 which constitutes a substantially horizontal wall of the hood ledge 11. It is preferable that the bracket 1 is made of a strong leaf spring material by bending it in a predetermined form. The bracket 1 has at its center a fitting portion 15 to be set in contact with the attaching portion 5. Both ends of the bracket 1 are bent to form an erecting portion, respectively. Such an erecting portion constitutes a first engaging portion 2. The first engaging portions 2 are so designed as to hold a tank T therebetween so that the tank can be prevented from displacing in its longitudinal direction. Each erecting portion of the bracket 1 is notched in a rectangular shape to form a second engaging portion 3 on both side surfaces of the notched portion. When each projection 12 formed on both sides of the tank T at its lower portion is inserted into the second engaging portion 3, the tank T can be prevented from displacing in its lateral direction. The side form of the projections 12 is so designed as to correspond to that of the second engaging portion 3 in order to increase the holding effect thereof. The upper portion of the first engaging portion 2 is bent in a channel shape to form a space for receiving a relatively long rectangular projection 13 fixed horizontally on the opposite side walls of the tank T. Such a bent portion of the first engaging portion 2 constitutes a third engaging portion 4. When the projections 13 of the tank T are properly fitted into the third engaging portions 2, respectively, the tank T can be prevented from moving upward in such a way that it slips off.

In the first embodiment, the upper ends of the first engaging portions 2 are inclined to each other as shown by the chain line 2' in FIG. 7 so as to bring them into closer relationship when the tank T is not fitted onto the fitting bracket 1. As the insertion of the tank T into the bracket 1 proceeds, both upper ends of the first engaging portions 2 are pressed outwardly from each other by the tank T. After the projections 13 of the tank T are fitted into the third engaging portions 4, respectively, the tank T can be prevented from moving upwardly even if it vibrates because the oscillation of the vehicle body.

Accordingly, the tank T is held stably by the first, second and third engaging portions 2, 3 and 4 of the fitting bracket 1 which is fixed at its center by the screw means 14 on the attaching portion 5 of the hood ledge 11. That is, the first engaging portions 2 are engaged with the opposite side walls of the tank T, the second engaging portions 3 are engaged with the box-like projections 12 on the opposite side walls of the tank at its lower position, and the third engaging portions 4 are engaged with the strip-like projections 13 on the tank at its intermediate position.

Figure 8:
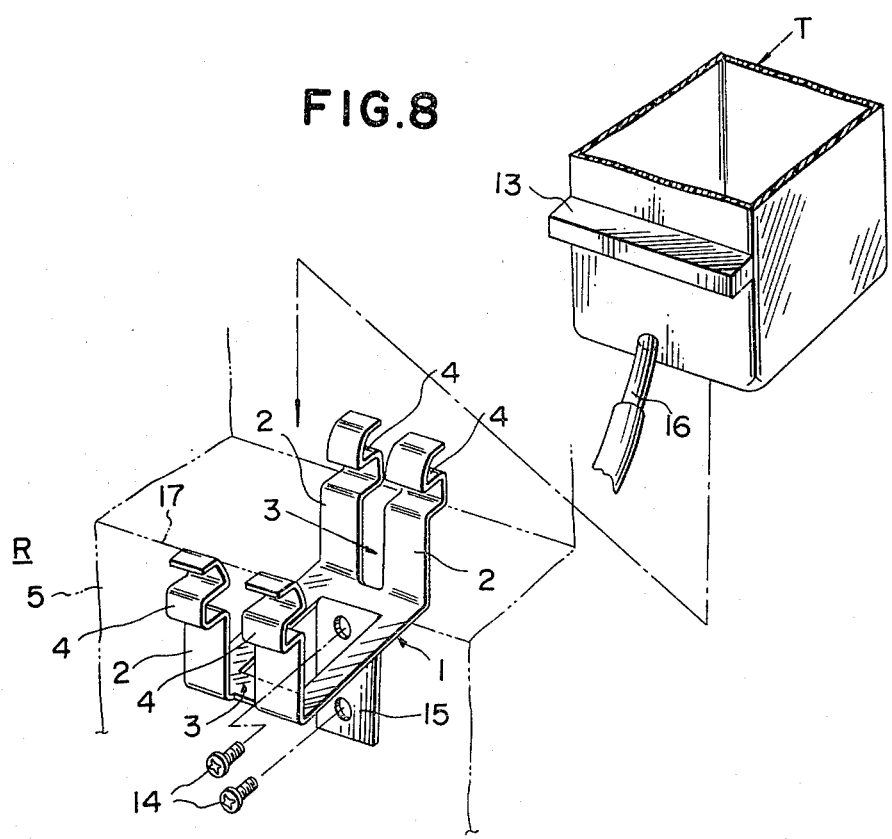
FIG. 8 is a perspective view showing a fitting structure for a tank according to a second embodiment of the present invention.

FIG. 8 shows a second embodiment of the present invention. Although the fitting bracket 1 has at its both sides the first, second and third engaging portions 2, 3 and 4 as in the first embodiment as above-stated, one of the second engaging portions 3 is to be engaged with the base of an exit pipe 16 for cleaning liquid or the like in place of the projections 12 in the first embodiment, one of which is omitted in the second embodiment. The fitting portion 15 at the center of the bracket 1 is partially cut off and bent downwardly and set at a corner 17 from a horizontal wall of the vehicle body to a vertical wall thereof so that the fitting portion 15 and the vertical wall of the fitting portion 5 is fixed by the screw means 14. The second embodiment can be suitably applied to a fitting structure in which the whole of such a horizontal wall as the hood ledge 11 can not be utilized as the fitting portion 5. Also, according to the second embodiment of the present invention, because one of the projections 12 formed on the both sides of the tank T at its lower portion in the first embodiment is omitted, the form of the tank can be simplified.

Figure 9:
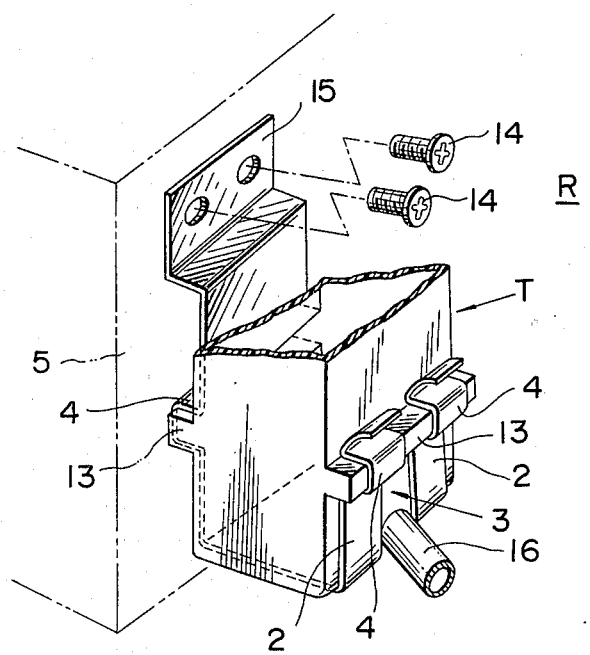
FIG. 9 is a sectional view showing a fitting structure according to a third embodiment of the present invention.

FIG. 9 shows a third embodiment of the present invention. The fitting portion 15 is formed at one end of the bracket 1, extending upwardly therefrom. Only a vertical wall of the fitting portion 5 is adapted to fix the fitting portion 15 of the bracket 1 thereon by the screw means 14 so that the tank T can be set within the engine compartment R.

As can be seen from the foregoing, according to the present invention, the fitting bracket is so detachably held thereby when it is inserted between the erecting ends of the bracket 1 downwardly. Therefore, only a space corresponding to the sectional area of the tank T in its horizontal direction is required in order to fit the tank T on the bracket 1 within the engine compartment R. Even if the space is extremely restricted among the parts fitted within the engine compartment R, a desired tank can be easily set on the fitting bracket 1. Thus, the effective utilization of the restricted space in the engine compartment becomes possible. Also, the stability of the tank fitted on the bracket can be increased because the lower portion of the tank is held by the bracket 1.

The present invention is not limited to the embodiments shown and described herein, but can include other modifications and changes thereof without departing from the spirit or scope of the present invention. For example, although the window washer tank is explained as a tank made of a synthetic resin in the shown embodiments, the present invention may be applied to other type tanks such as a head lamp washer tank, a reserve tank for engine-cooling water, and the like. Also, the bracket can be attached onto any suitable parts within the engine compartment. If the tank is made of a vertical type, the upper portion of the tank can be fixed on a portion of the vehicle body by any suitable bracket means so that the vibration of the upper portion of the tank can be avoided. In another aspect of the present invention, the second and third engaging portions of the bracket may be so designed as to protrude toward the tank while the tank has the recessed portions for receiving such protruding portions of the bracket.

What is claimed is:

1. A structure for fitting a tank in an engine compartment of a vehicle body, comprising a fitting member for partitioning the engine compartment, and a bracket fixed on the fitting member, the bracket having a first engaging portion for positioning the tank in its longitudinal direction, a second engaging portion for positioning the tank in its lateral direction and a third engaging portion for positioning the tank in its vertical direction, the first, second and third engaging portions of the bracket being so designed as to engage with the opposite side walls of the tank thereby to hold detachably the lower portion of the tank relative to the vehicle body when the tank is set in position onto the bracket and wherein both end portions of the bracket are bent to form an erecting portion, respectively, such bent portions constituting the first engaging portion in such a way that the tank is held between the bent end portions of the bracket, the bent portions of the bracket being further bent outwardly in a channel shape to constitute the third engaging portion with which a projection fixed on each opposite side wall of the tank at its intermediate portion is to be engaged.

2. A fitting structure as defined in claim 1 wherein the bracket is made of a leaf spring material.

3. A fitting structure as defined in claim 1 wherein the bracket has at its intermediate portion a fitting portion to be attached to the fitting member.

4. A fitting structure as defined in claim 1 wherein the bracket has at one end thereof a fitting portion to be attached to the fitting member.

5. A fitting structure as defined in claim 3 wherein the fitting portion of the bracket at its intermediate portion is partially cut off and bent to extend downwardly so that the bracket can be attached through the fitting portion onto the fitting member.

6. A fitting structure as defined in claim 1 wherein the bent end portions of the bracket are cut off to constitute the second engaging portion with which a projection fixed on a side wall of the tank at its lower portion is to be engaged.

7. A structure as defined in claim 1 wherein the bent end portions of the bracket are cut off to constitute the second engaging portion with which two projections fixed on the opposite sides of the tank at its lower portion are to be engaged, respectively.

8. A structure as defined in claim 1 wherein the second and third engaging portions of the bracket are so designed as to protrude toward the tank while the tank has a recessed portion for receiving such protruding portions of the bracket.

9. In a structure for fitting a tank in an engine compartment of a vehicle body, including a fitting member fixed relative to the vehicle body, and a bracket fixed to the fitting member, the bracket comprising:
- a first engaging portion having a pair of opposing portions vertically erected in parallel in such a way that the first engaging portion holds the tank between the pair of opposing portions so that the tank can be prevented from moving in a first direction;
- a second engaging portion having an opening formed in the first engaging portion in such a manner that a projection of the tank can engage an edge forming the opening of the second engaging portion so that the tank can be prevented from moving in a second direction; and
- a third engaging portion formed in a channel shape at the first engaging portion in a horizontal direction in such a manner that a projection formed on the tank engages the third engaging portion so that the tank can be prevented from moving in a third direction.

10. In combination, an engine compartment of a vehicle body, a tank placed in the engine compartment, a fitting member fixed relative to the vehicle body within the engine compartment, and a bracket fixed to the fitting member, the bracket comprising:
- a first engaging portion including two pair of leaf springs extending in parallel, each pair of leaf springs holding the tank therebetween by the biasing force thereof so that the tank can be prevented from moving in a first direction;
- a second engaging portion including an opening formed between the two adjacent leaf springs in which a projection formed to the tank can be set so that, when the projection of the tank engages the edges of the two adjacent leaf springs forming the opening, the tank can be prevented from moving in a second direction; and
- a third engaging portion including a channel-shaped portion outwardly bent at each leaf spring in such a manner that a projection formed on a side portion of the tank can engage the channel-shaped portion of the third engaging portion so that the tank can be prevented from moving in a third direction.

11. A structure for fitting a tank to a fitting member by means of a bracket, characterized in that the bracket comprises:
- a first engaging portion including two pair of leaf springs extending in parallel, each pair of leaf springs holding the tank therebetween by the biasing force thereof so that the tank can be prevented from moving in a first direction;
- a second engaging portion including an opening formed between the two adjacent leaf springs in which a projection formed on the tank can be set so that, when the projection of the tank engages the edges of the two adjacent leaf springs forming the opening, the tank can be prevented from moving in a second direction; and
- a third engaging portion including a channel-shaped portion outwardly bent at each leaf spring in such a manner that a projection formed on a side portion of the tank can engage the channel-shaped portion of the third engaging portion so that the tank can be prevented from moving in a third direction.

12. A structure for fitting a tank in an engine compartment of a vehicle body, comprising a fitting member for partitioning the engine compartment, and a bracket fixed on the fitting member, the bracket having a first engaging portion for positioning the tank in its longitudinal direction, a second engaging portion for positioning the tank in its lateral direction and a third engaging portion for positioning the tank in its vertical direction, the first, second and third engaging portions of the bracket being so designed as to engage with the opposite side walls of the tank thereby to hold detachably the lower portion of the tank relative to the vehicle body when the tank is set in position onto the bracket, both end portions of the bracket being bent to form an erecting portion, respectively, said bent portions constituting the first engaging portion in such a way that the tank is held between the bent end portions of the bracket, and wherein the bent end portions of the bracket are cut off to constitute the second engaging portion with which a projection fixed on a side wall of the tank at its lower portion is to be engaged, and wherein the bent portion constituting the first engaging portion is formed at both ends, and the upper portions of the bent portions are inwardly inclined to each other so as to bring them into closer relationship whereby the tank can be resiliently held between the upper portions of the bent portions.

13. A structure for fitting a tank in an engine compartment of a vehicle body, comprising a fitting member for partitioning the engine compartment, and a bracket fixed on the fitting member, the bracket having a first engaging portion for positioning the tank in its longitudinal direction, a second engaging portion for positioning the tank in its lateral direction and a third engaging portion for positioning the tank in its vertical direction, the first, second and third engaging portions of the bracket being so designed as to engage with the opposite side walls of the tank thereby to hold detachably the lower portion of the tank relative to the vehicle body when the tank is set in position onto the bracket and wherein both end portions of the bracket are bent to form an erecting portion, respectively, such bent portions constituting the first engaging portion in such a way that the tank is held between the bent end portions of the bracket and wherein the bent end portions of the bracket are cut off to constitute the second engaging portion and wherein a projection fixed on a side wall of the tank is to be engaged with one of the cut off portions in the bent end portions of the bracket while an exit pipe fixed to the tank is to be engaged with the other cut off portion therein.

* * * * *